(12) United States Patent
Shin

(10) Patent No.: US 9,245,460 B2
(45) Date of Patent: Jan. 26, 2016

(54) MULTIPURPOSE ROTATION STRUCTURE

(71) Applicant: Myong-Sop Shin, Gyeonggi-do (KR)

(72) Inventor: Myong-Sop Shin, Gyeonggi-do (KR)

( * ) Notice: Subject to any disclaimer, the term of this patent is extended or adjusted under 35 U.S.C. 154(b) by 196 days.

(21) Appl. No.: 13/914,706

(22) Filed: Jun. 11, 2013

(65) Prior Publication Data

US 2014/0220534 A1 Aug. 7, 2014

(30) Foreign Application Priority Data

Feb. 5, 2013 (KR) .......................... 10-2013-0012873

(51) Int. Cl.
*G09B 23/18* (2006.01)
(52) U.S. Cl.
CPC ...................................... *G09B 23/18* (2013.01)
(58) Field of Classification Search
CPC ........ G09B 23/00; G09B 23/06; G09B 23/18; H02K 7/09; H02K 1/276
USPC ................................. 417/420; 310/83; 73/468
See application file for complete search history.

(56) References Cited

FOREIGN PATENT DOCUMENTS

KR 10-2000-0066371 A 11/2000

*Primary Examiner* — Timothy A Musselman
(74) *Attorney, Agent, or Firm* — Rabin & Berdo, P.C.

(57) ABSTRACT

Disclosed herein is a multipurpose rotation structure which is installed indoors or outdoors to be utilized for multiple purposes such as experience teaching tools by using repelling force between magnets disposed in an outer ring frame having the shape of a ring and in a weight body rotating in an inner space of the outer ring frame, by particularly using repelling force between magnets disposed in a weight body and a second weight body placed on the same guide ring, or by using repelling force between magnets disposed in an outer ring frame and an inner ring frame that are opposite to each other with respect to a weight body, or by using attractive force and repulsive force between magnets while sequentially changing the polarity of electromagnets disposed in an outer ring frame and an inner ring frame.

11 Claims, 21 Drawing Sheets

MULTIPURPOSE ROTATION STRUCTURE

BACKGROUND OF THE INVENTION

1. Field of the Invention

The present invention relates to multipurpose rotation structures and, more particularly, to a multipurpose rotation structure which is installed indoors or outdoors to be utilized for multiple purposes such as experience teaching tools by using repelling force between magnets disposed in an outer ring frame having the shape of a ring and in a weight body rotating in an inner space of the outer ring frame, and which particularly uses repelling force between magnets disposed in a weight body and a second weight body placed on the same guide ring, or uses repelling force between magnets disposed in an outer ring frame and an inner ring frame that are opposite to each other with respect to a weight body, or uses attractive force and repulsive force between magnets by sequentially changing the polarity of electromagnets disposed in an outer ring frame and an inner ring frame, and which can be utilized as a teaching tool for experiencing green energy to allow a user to experience an amount of green energy and the magnitude of power generated therefrom or utilized as a teaching tool for experiencing power generation using kinetic energy.

2. Description of the Related Art

Today, various facilities using a track or trajectory are used in real life. However, these facilities are limited in installation space as well as available field, such as large-scale transport facilities or rides. Further, existing rotation structures, for example, a rotation structure disclosed in the following patent literature are problematic in that they are complicated in operating structure, so that their operation and maintenance are inefficient.

PATENT LITERATURE

Korean Patent Laid-Open Publication No. 10-2000-0066371 (published on Nov. 15, 2000); "Prime Mover for Horizontal Track Device of Lever"

Recently, in order to substitute energy using existing fossil fuel, interest in and research into a variety of facilities for producing green energy such as solar-light power generators have increased. However, as compared to the increased interest, facilities for experiencing the production and utility of green energy have not sufficient up to now. Particularly for the education of growing children, there is a pressing need for a teaching tool that enables children to learn the production, utility and importance of green energy by direct and actual experience.

SUMMARY OF THE INVENTION

Accordingly, the present invention has been made keeping in mind the above problems occurring in the related art, and an object of the present invention is to provide a multipurpose rotation structure which is installed indoors or outdoors to be utilized for multiple purposes such as experience teaching tools by using repelling force between magnets disposed in an outer ring frame having the shape of a ring and in a weight body rotating in an inner space of the outer ring frame Another object of the present invention is to provide a multipurpose rotation structure which can be utilized for multiple purposes such as experience teaching tools by using repelling force between magnets disposed in a weight body and a second weight body placed on the same guide ring.

A further object of the present invention is to provide a multipurpose rotation structure which can be utilized for multiple purposes such as experience teaching tools by using repelling force between magnets disposed in an outer ring frame and an inner ring frame that are opposite to each other with respect to a weight body.

Yet another object of the present invention is to provide a multipurpose rotation structure, in which each of electromagnets arranged on an outer ring frame and an inner ring frame, respectively, is changed to have a polarity opposite to that of a permanent magnet of a weight body that is to face the electromagnets when the weight body rotates and approaches, and is changed to have the same polarity as that of the permanent magnet of the weight body facing the electromagnets when the weight body further rotates and passes, so that the multipurpose rotation structure is utilized for multiple purposes such as experience teaching tools using the attractive force and repulsive force between magnets.

A still further object of the present invention is to provide a multipurpose rotation structure which includes a motor operated via green energy produced from a solar-light power generator, and a display unit displaying an amount of the inputted green energy and a magnitude of power of the motor obtainable from the inputted green energy, thus enabling a user to directly perceive the amount of the green energy and the magnitude of the power obtainable therefrom, and thereby being utilized as a teaching tool for experiencing green energy.

An additional object of the present invention is to provide a multipurpose rotation structure which further includes a generator generating power using kinetic energy of a rotation shaft that rotates in conjunction with rotation of a weight body, and in which an amount of energy generated by the generator is separately displayed on the display unit, so that the multipurpose rotation structure is utilized as a teaching tool for experiencing power generation using the kinetic energy.

In order to accomplish the above objects, the multipurpose rotation structure has the following configuration.

According to an aspect of the present invention, a multipurpose rotation structure includes an outer ring frame formed in a ring shape having a predetermined thickness, with magnets being sequentially provided in the outer ring frame in a circumferential direction thereof; a weight body provided on a first end of a connection shaft, rotating around a rotation shaft to which a second end of the connection shaft is secured, and including a permanent magnet, the permanent magnet having, on a surface of the weight body that faces the outer ring frame, polarity that is the same as that of the magnets sequentially arranged in the circumferential direction of the outer ring frame; a guide ring connected to a central portion of the weight body, and guiding the weight body that is rotatably formed along a trajectory on which the weight body rotates; and a motor connected to the rotation shaft, and giving power when the weight body rotates upwards from a lower position to an upper position.

According to another aspect of the present invention, each of the magnets arranged in the circumferential direction of the outer ring frame may have a shape of an isosceles triangle so that both sides thereof with respect to a perpendicular line of a vertex thereof have opposite polarities, and the magnets arranged successively in the circumferential direction of the outer ring frame may be overlappingly disposed in such a way that a side of a magnet is laid over a side of an adjacent magnet, whereby the same polarity may be always placed on an inner circumference of the outer ring frame 10.

According to a further aspect of the present invention, the multipurpose rotation structure may further include a second weight body provided on the guide ring that is formed along the trajectory on which the weight body rotates, the second weight body being smaller in weight than the weight body and including a permanent magnet, wherein magnets having the same polarity may be disposed, respectively, on surfaces of the weight body and the second weight body making contact each other while they are rotating, thus maximizing a repelling force caused by an impact between the weight body and the second weight body.

According to another aspect of the present invention, each of the weight body and the second weight body may include bar-shaped permanent magnets on both ends thereof, each of the permanent magnets having different polarities on left and right sides thereof, and the bar-shaped permanent magnets may be arranged in such a way that the same polarity is placed on both the ends of the weight body and the second weight body.

According to another aspect of the present invention, the multipurpose rotation structure may further include an inner ring frame formed in a ring shape having a predetermined thickness, and positioned in an inner space of the outer ring frame in such a way so as to be opposite to the outer ring frame with respect to the guide ring, with magnets being provided in the inner ring frame in such a way so as to be sequentially arranged in a circumferential direction thereof, wherein the weight body may include, on a surface thereof facing the inner ring frame, a permanent magnet that has the same polarity as the magnets that are sequentially arranged in the circumferential direction of the inner ring frame.

According to another aspect of the present invention, the inner ring frame may be a pair of inner ring frames that are provided, respectively, on left and right sides of a trajectory along which the connection shaft connected to the weight body passes, in such a way so as to be spaced apart from each other by a predetermined interval.

According to another aspect of the present invention, permanent magnets arranged on the outer ring frame and permanent magnets arranged on the inner ring frame may be spaced, respectively, apart from each other by predetermined intervals in circumferential directions thereof, and portions of the outer ring frame on which the permanent magnets are disposed may correspond to portions of the inner ring frame on which the permanent magnets are not disposed, the outer and inner ring frames being disposed such that the permanent magnets of the outer ring frame do not directly face the permanent magnets of the inner ring frame.

According to another aspect of the present invention, the magnets arranged on the outer ring frame and the inner ring frame, respectively, may be electromagnets, and each of the electromagnets arranged on the outer ring frame and the inner ring frame, respectively, may be changed in polarity such that it has a polarity opposite to a polarity of the permanent magnet of the weight body that is to face the electromagnets when the weight body rotates and approaches, but has the same polarity as a polarity of the permanent magnet of the weight body facing the electromagnets when the weight body further rotates and passes.

According to another aspect of the present invention, in a region where the weight body does a free fall and rotates upwards by inertia, current supplied to each of the electromagnets arranged on the outer ring frame and the inner ring frame, respectively, may be cut off, thus reducing required energy.

According to another aspect of the present invention, the motor may be operated by inputting green energy produced from a solar-light power generation facility, and a display unit may be further included to display an amount of the inputted green energy and a magnitude of power of the motor obtainable from the inputted green energy, whereby the multipurpose rotation structure enables a user to directly perceive the amount of the green energy and the magnitude of the power obtainable therefrom, thus being utilized as a teaching tool for experiencing green energy.

According to another aspect of the present invention, the multipurpose rotation structure may further include a generator generating power using kinetic energy of the rotation shaft that rotates in conjunction with rotation of the weight body, wherein an amount of energy generated by the generator may be separately displayed on the display unit, so that the multipurpose rotation structure is utilized as a teaching tool for experiencing power generation using the kinetic energy.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF PREFERRED EMBODIMENTS

Hereinafter, preferred embodiments of a multipurpose rotation structure according to the present invention will be described in detail with reference to the accompanying drawings. When it is determined that the detailed description of the known art related to the present invention may obscure the gist of the present invention, the detailed description will be omitted. Throughout the specification, it should be understood that the meaning of "comprise" may include components other than specified components, unless the context clearly dictates otherwise.

Figure 1:
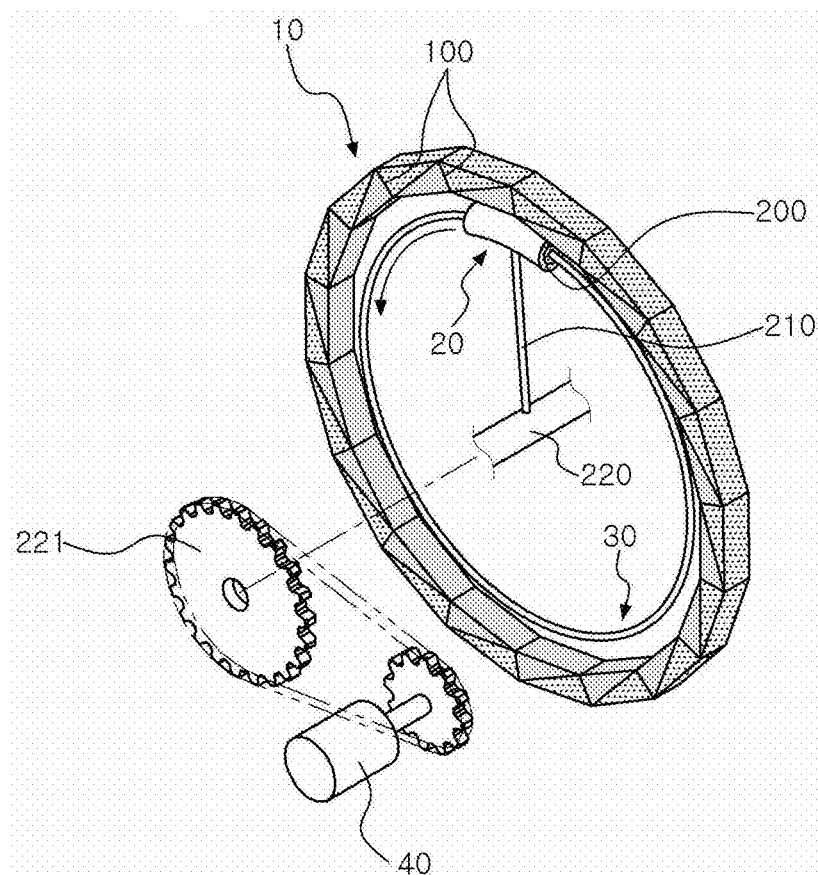
FIG. 1 is an exploded perspective view showing a multipurpose rotation structure according to an embodiment of the present invention.
Figure 2:
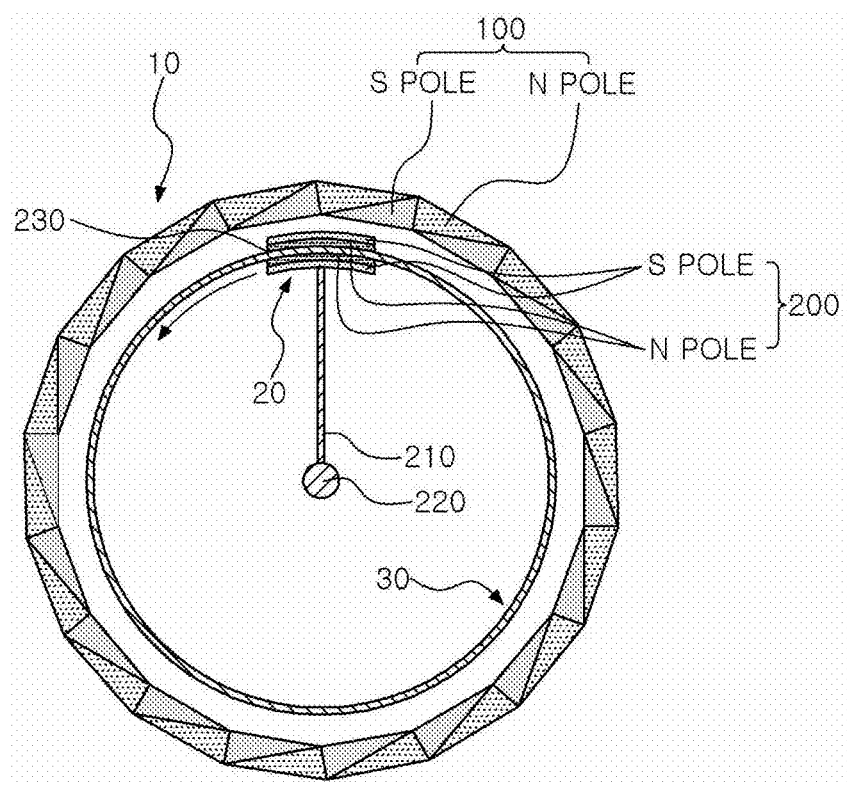
FIG. 2 is a sectional view showing the polarity of magnets disposed on an outer ring frame and a weight body of FIG. 1.

Referring to FIGS. 1 and 2, a multipurpose rotation structure according to an embodiment of the present invention includes an outer ring frame 10 formed in a ring shape having a predetermined thickness, with magnets 100 being sequentially provided in the outer ring frame 10 in a circumferential direction thereof. A weight body 20 is provided on a first end of a connection shaft 210, rotates around a rotation shaft 220 to which a second end of the connection shaft 210 is secured, and includes a permanent magnet 200, the permanent magnet 200 having, on a surface of the weight body 20 that faces the outer ring frame 10, a polarity that is the same as that of the magnets 100 sequentially arranged in the circumferential direction of the outer ring frame 10. A guide ring 30 is connected to a central portion of the weight body 20, and guides the weight body 20 that is rotatably formed along a trajectory on which the weight body 20 rotates. A motor 40 is connected to the rotation shaft 220, and gives power when the weight body 20 rotates upwards from a lower position to an upper position.

The outer ring frame 10 is formed in the shape of the ring having a predetermined thickness, and includes the magnets 100 that are arranged sequentially in the circumferential direction thereof. As shown in FIG. 1, the outer ring frame 10 is in the form of the ring having a predetermined thickness, and the weight body 20, the guide ring 30 and other components that will be described below in detail are positioned in a space defined inside the outer ring frame 10. Further, the magnets 100 are provided in the outer ring frame 10 in such a way so as to be arranged sequentially in the circumferential direction thereof. Each magnet 100 may be a permanent magnet having fixed polarity, but may be an electromagnet which varies in polarity depending on a supplied current, as will be described below.

If the magnet 100 is the permanent magnet, as shown in FIG. 2, each of the magnets 100 arranged in the circumferential direction of the outer ring frame 10 is formed in the shape of an isosceles triangle so that both sides of the isosceles triangle with respect to a perpendicular line of a vertex thereof are formed to have opposite polarities. The magnets 100 arranged successively in the circumferential direction of the outer ring frame 10 are overlappingly disposed in such a way that a side of a magnet 100 is laid over a side of an adjacent magnet 100, so that the same polarity is always placed on an inner circumference of the outer ring frame 10. That is, the magnet formed in the shape of the isosceles triangle is configured such that both sides of the isosceles triangle with respect to the perpendicular line extending from the vertex to the side have opposite polarities. When the magnets 100 each having the shape of the isosceles triangle are arranged in the circumferential direction of the outer ring frame 10, as shown in FIG. 2, two magnets 100 are partially overlappingly disposed in such a way that a side (e.g., a portion having the magnetic property of an N pole) of the magnet 100 is laid over a side (e.g., a portion having the magnetic property of an S pole) of the magnet 100. Such a disposition is repeated in the circumferential direction of the outer ring frame 10, so that the same polarity (e.g., the S pole) is always placed on the inner circumference of the outer ring frame 10.

The weight body 20 is provided on the first end of the connection shaft 210, rotates around the rotation shaft 220 to which the second end of the connection shaft 210 is secured, and includes the permanent magnet 200 having, on the surface of the weight body 20 that faces the outer ring frame 10, a polarity that is the same as that of the magnets 100 sequentially arranged in the circumferential direction of the outer ring frame 10. That is, as shown in FIG. 1, the weight body 20 having a predetermined weight is formed on the first end of the connection shaft 210 and configured to rotate along with the rotation shaft 220 and the connection shaft 210 around the rotation shaft 220 that holds the second end of the connection shaft 210, with the permanent magnet 200 included in the weight body 20.

As shown in FIG. 2, the permanent magnet 200 included in the weight body 20 may be disposed such that the surface thereof facing the outer ring frame 10 of the weight body 20 (i.e., the surface opposite to the outer ring frame 10) has the same polarity (e.g., the S pole) as the polarity (e.g., the S pole) facing the inner circumference of the outer ring frame 10, among the polarities of the magnets 100 included in the outer ring frame 10. As such, if the magnets disposed on the facing surfaces of the outer ring frame 10 and the weight body 20, respectively, have the same polarity, the magnetic force of the magnets 100 of the stationary outer ring frame 10 pushes the permanent magnet 200 of the rotating weight body 20 due to a repulsive force (repelling force) acting between the magnets having the same polarity, thus aiding in rotating the weight body 20 more rapidly.

The guide ring 30 is connected to the central portion of the weight body 20, and is formed along the trajectory on which the weight body 20 rotates, thus guiding the rotating weight body 20. To this end, a hollow portion 230 may be formed in the central portion of the weight body 20 to allow the guide ring 30 to pass therethrough. Thus, the weight body can continue to rotate stably without deviating from a predetermined track along the guide ring 30 that passes through the hollow portion 230 of the weight body 20 and is formed along the rotation trajectory of the weight body 20 rotating around the rotation shaft 220.

The motor 40 is connected to the rotation shaft 220, and gives power when the weight body 20 rotates upwards from a lower position to an upper position. In other words, until the weight body 20 rotates counterclockwise from a top point to a bottom point in the sectional view of FIG. 2, the weight body 20 does a free fall using potential energy resulting from gravity, so that it is unnecessary to supply additional energy. Until the weight body 20 rotates counterclockwise from the bottom point to an approximately 3 o'clock point, the weight body 20 rotates upwards by inertia, so that it is also unnecessary to supply additional energy. Subsequently, when it is required to continue to rotate the weight body 20 to the top point again, energy required to rotate the weight body 20 should be supplied. The weight body 20 is supplied with this energy via the motor 40. As shown in FIG. 1, the motor 40 is connected to a rotation shaft gear 221 on the rotation shaft 220 using a belt, chain, etc. Thus, as the motor 40 rotates the rotation shaft gear 221, the rotation shaft 220 is rotated, thus causing the connection shaft 210 and the weight body 20 to be rotated in conjunction with the rotation of the rotation shaft 220.

Figure 10:
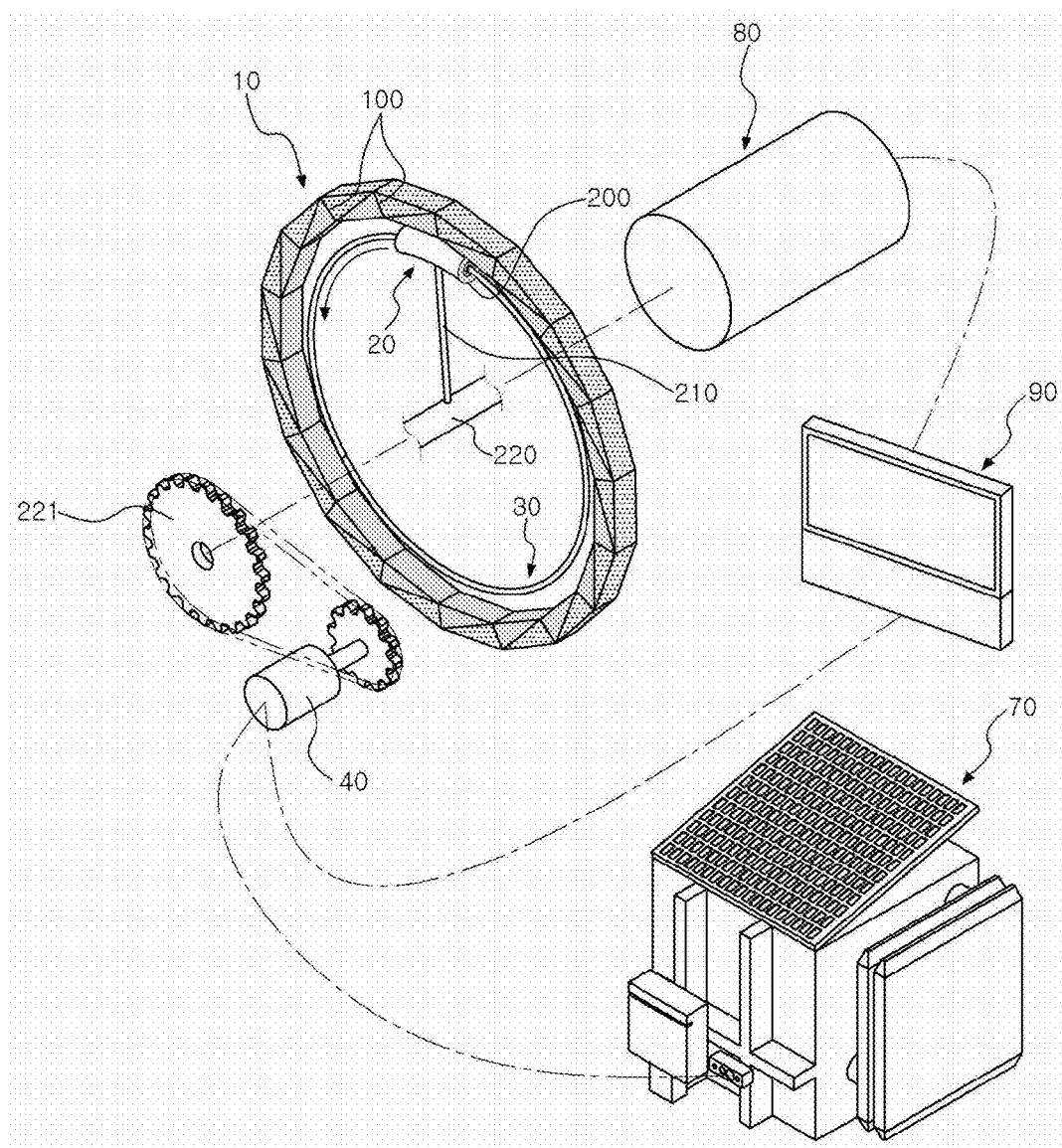
FIG. 10 is an exploded perspective view showing a multipurpose rotation structure according to another embodiment of the present invention.

According to the present invention, as shown in FIG. 10, the motor 40 is operated by inputting green energy produced from a solar-light power generation facility 70. A display unit 90 is further included to display an amount of the inputted green energy and a magnitude of power of the motor 40 obtainable from the inputted green energy. Thereby, the multipurpose rotation structure of this invention enables a user to directly perceive the amount of the green energy and the magnitude of the power obtainable therefrom, thus being utilized as a teaching tool for experiencing the green energy.

That is, particularly in the case where the multipurpose rotation structure according to the present invention is used as the teaching tool by directly experiencing the power of green energy produced from green energy production facilities such as the solar-light power generation facility 70 and realizing the utility and importance of the green energy, the display unit 90 performs as a displaying operation to cause users to directly visually perceive the amount of green energy produced from the solar-light power generation facility 70 and the magnitude of power generated from the motor 40 that is operated by the inputted green energy. The display unit 90 is installed around the multipurpose rotation structure in such a way that users can easily see the display unit 90. Therefore, as users perceive the moving process of the multipurpose rotation structure that continuously repeats rotating motions, the amount of the green energy displayed on the display unit 90 and the magnitude of the power generated therefrom, they can realize the utility and importance of the green energy more vividly while finding enjoyment and interest as compared to teaching via writing or speaking, thus heightening a learning effect.

Figure 3:
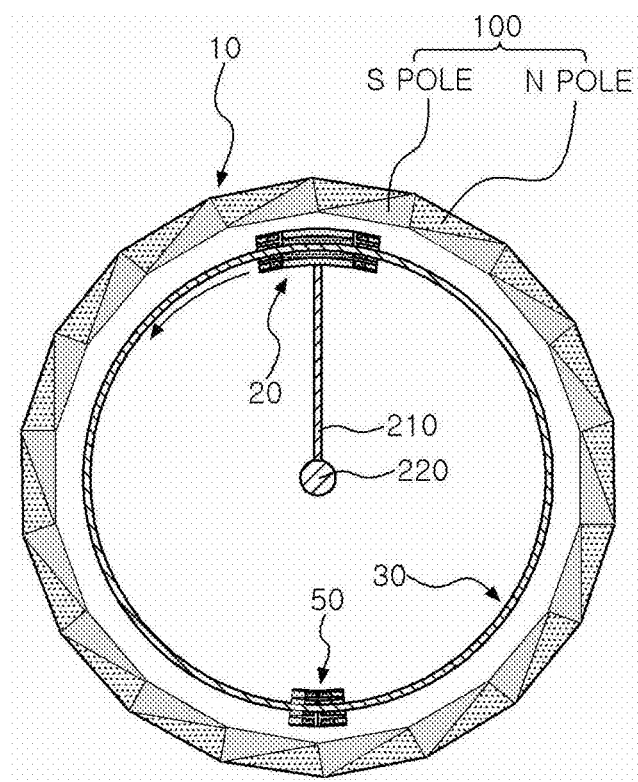
FIG. 3 is a sectional view showing a multipurpose rotation structure according to another embodiment of the present invention.

Referring to FIGS. 3 to 5, the multipurpose rotation structure according to another embodiment of the present invention may further include a second weight body 50. The second weight body 50 is provided on the guide ring 30 formed along the trajectory on which the weight body 20 rotates, is relatively smaller in weight than the weight body 20, and includes a permanent magnet 200.

As shown in FIG. 3, the second weight body 50 is configured such that its rotation is guided by the guide ring 30 while the second weight body 50 rotating on the guide ring 30 formed along the trajectory on which the weight body 20 rotates, separately from the weight body 20 (to this end, the configuration of the hollow portion 230 of the weight body 20 is also applied to a central portion of the second weight body 50). The second weight body 50 is smaller in weight than the weight body 20, and also includes the permanent magnet 200 therein. Since both the weight body 20 and the second weight body 50 are located on the same guide ring 30, the weight body and the second weight body 50 collide with each other during rotation. Here, the permanent magnets 200 having the same polarity are disposed on surfaces of the weight body 20 and the second weight body 50 that meet each other while they are rotating, thus maximizing a repelling force by an impact between the weight body 20 and the second weight body 50.

Figure 4A:
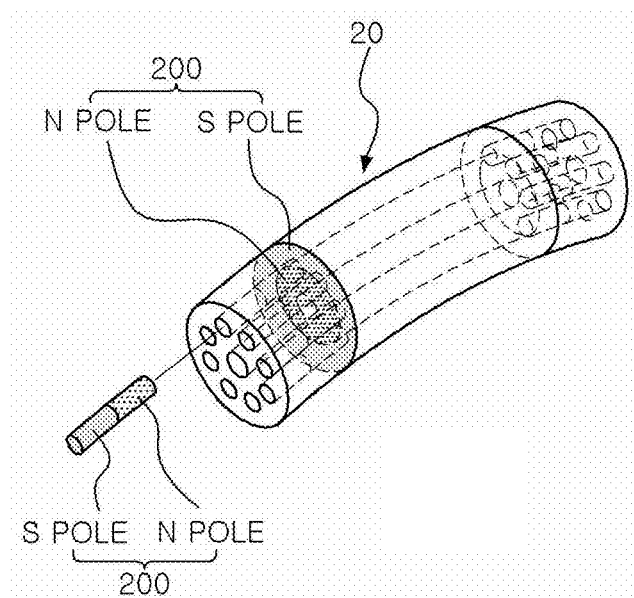
FIGS. 4A and 4B are views illustrating the polarity of magnets disposed on a weight body and a second weight body of FIG. 3.
Figure 4B:
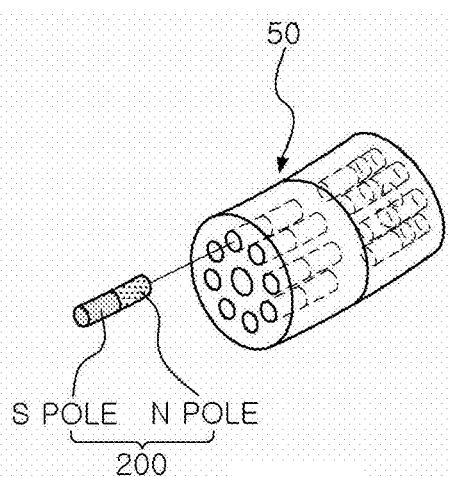

That is, as shown in FIGS. 4A and 4B, each of the weight body 20 and the second weight body 50 may be formed to have bar-shaped permanent magnets 200 on both ends thereof. The bar-shaped permanent magnet 200 is configured such that different polarities are provided, respectively, on left and right sides of the magnet 200. Here, if the bar-shaped permanent magnets 200 provided on both ends of the weight body 20 are oriented to have the polarity of the S pole on both ends thereof, by way of example, the bar-shaped permanent magnets 200 provided on both ends of the second weight body 50 are also oriented to have the same polarity, that is, the S pole on both ends thereof. This is for the purpose of increasing a repelling force by an impact between the weight body 20 and the second weight body 50 which collide with each other while they are rotating.

Figure 5A:
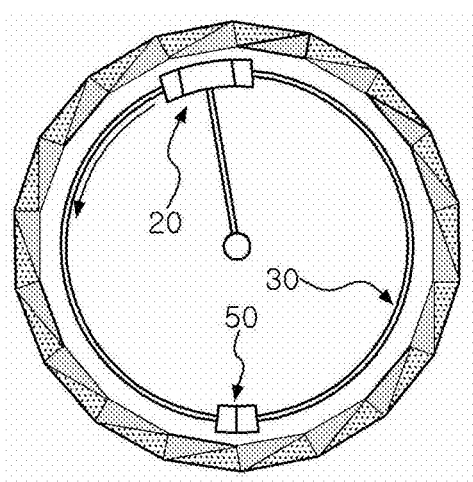
FIGS. 5A to 5E are views illustrating a movement relationship between the weight body and the second weight body of FIG. 3.
Figure 5B:
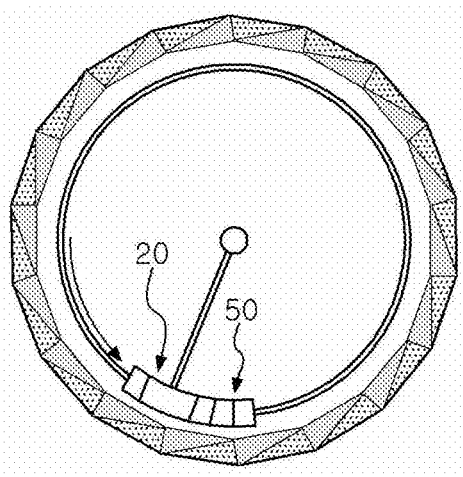
Figure 5C:
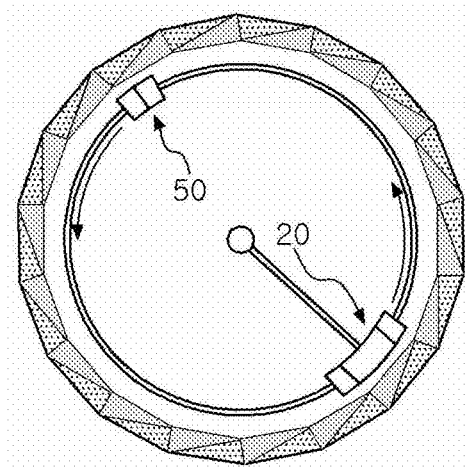
Figure 5D:
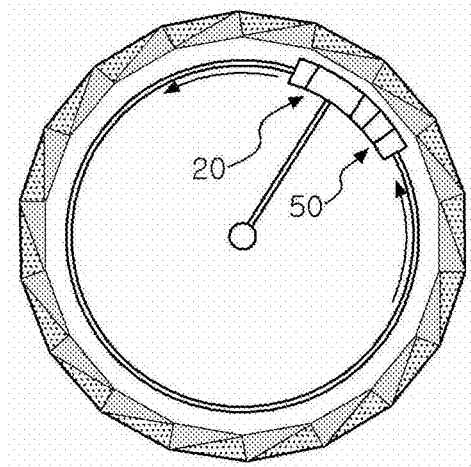
Figure 5E:
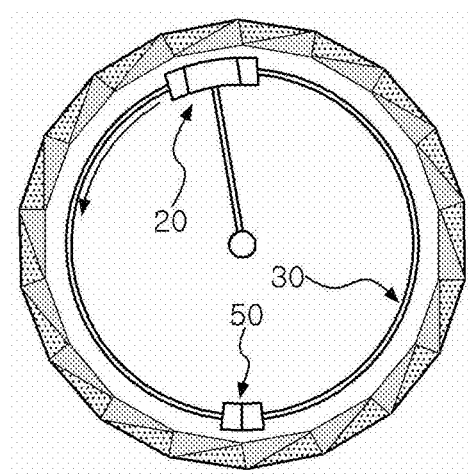

The collision between the weight body 20 and the second weight body 50 due to their rotation and the action of the repelling force will be described with reference to FIGS. 5A to 5E. First, as shown in FIG. 5A, the second weight body 50 is in a bottom position of the guide ring 30, and the weight body 20 rotates counterclockwise from a top point of the guide ring 30 downwards. At this time, as shown in FIG. 5B, the weight body 20 and the second weight body 50 may collide with each other at the bottom position of the guide ring 30. However, since the permanent magnets 200 of the same polarity are disposed on the surfaces of the weight body 20 and the second weight body 50 which collide with and meet each other, a repulsive force between the magnets 200 of the same polarity is added to a repelling force generated by a direct collision between the weight body 20 and the second weight body 50, so that the repelling force is increased. Subsequently, as shown in FIG. 5C, the second weight body 50 having the relatively smaller weight rotates more rapidly than the weight body 20. As shown in FIG. 5D, while the weight body 20 rotates from approximately the 3 o'clock position to 12 o'clock position, the second weight body 50 that rotates more rapidly than the weight body 20 collides with the weight body 20, thus accelerating the rotation of the weight body 20. Thereafter, as shown in FIG. 5E, the second weight body 50 reaches the bottom position of the guide ring 30, and the weight body 20 rotates counterclockwise from the top point of the guide ring 30 downwards. Such a process is repeated.

Figure 6:
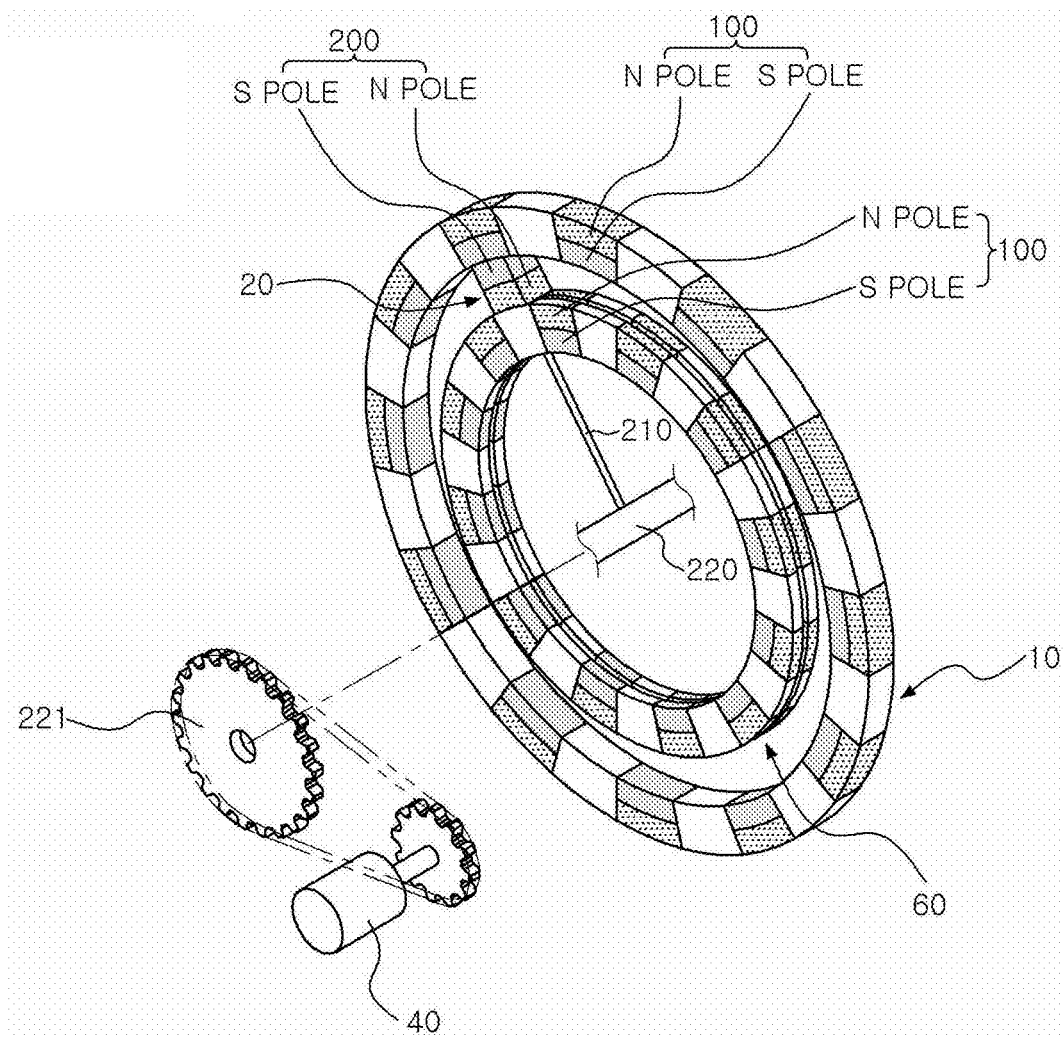
FIG. 6 is a perspective view showing a multipurpose rotation structure according to a further embodiment of the present invention.
Figure 7:
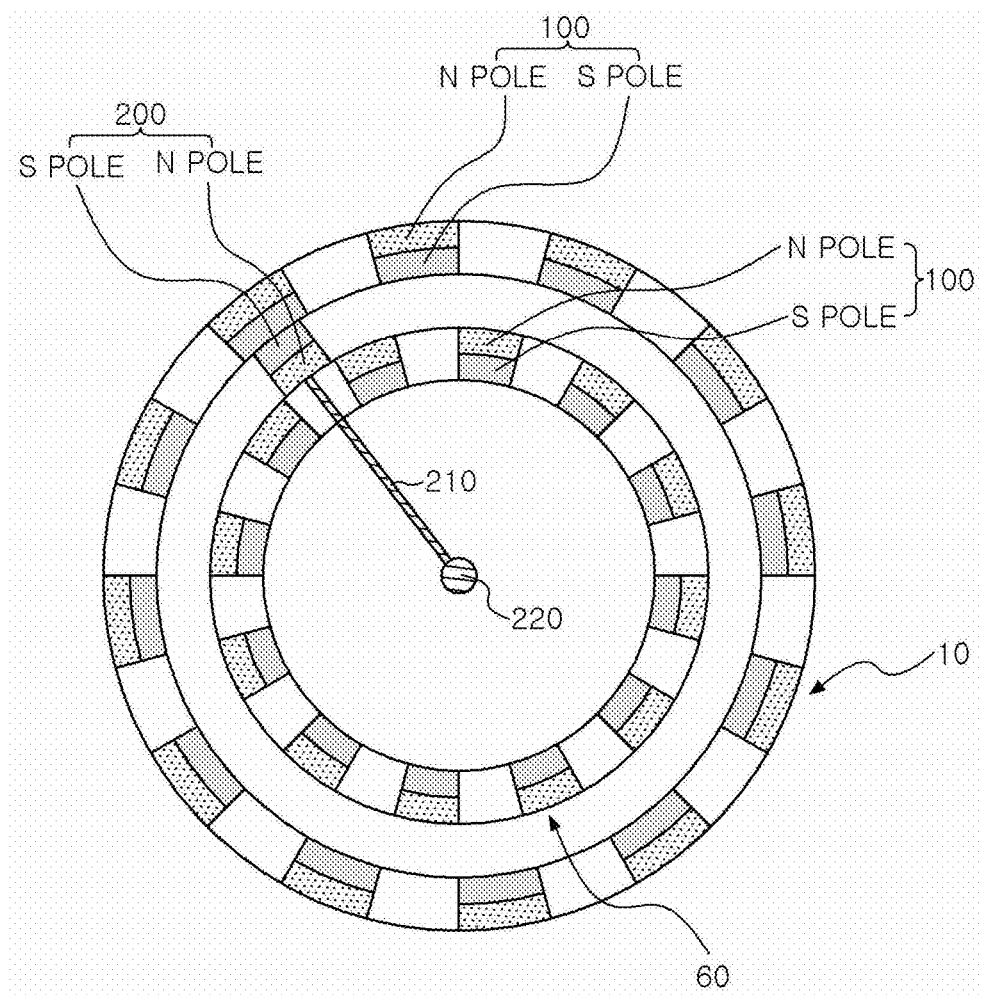
FIG. 7 is a sectional view showing the polarity of magnets disposed on an outer ring frame, a weight body, and an inner ring frame of FIG. 6.

Referring to FIGS. 6 and 7, a multipurpose rotation structure according to another embodiment of the present invention further includes an inner ring frame 60 that is formed in a ring shape having a predetermined thickness, and is positioned in an inner space of the outer ring frame 10 in such a way so as to be opposite to the outer ring frame 10 with respect to the guide ring 30, with magnets 100 being provided in the inner ring frame 60 in such a way so as to be sequentially arranged in a circumferential direction thereof.

As shown in FIG. 6, the inner ring frame 60 is also formed in the ring shape having the predetermined thickness, similarly to the outer ring frame 10 having the ring shape. The inner ring frame 60 is positioned in the inner space of the outer ring frame 10, and particularly is opposite to the outer ring frame 10 with respect to the guide ring 30. Thus, the weight body 20 rotating along the guide ring 30 is spaced apart from the outer ring frame 10 and the inner ring frame 60 by the constant interval, so that the weight body 20 rotates between the outer ring frame 10 and the inner ring frame 60.

The magnets 100 are also provided in the inner ring frame 60 in such a way so as to be arranged sequentially in the circumferential direction thereof. The magnets 100 provided in the inner ring frame 60 are arranged in the same manner as the above-mentioned arrangement wherein the magnets 100 each having the shape of the isosceles triangle are arranged on the outer ring frame 10, or are arranged in the circumferential direction to be spaced apart from each other at regular intervals, as shown in FIG. 7. Hence, the detailed description of the magnet arrangement will be omitted herein to avoid a duplicated description thereof. In this case, the permanent magnet 200 of the weight body 20 situated between the outer ring frame 10 and the inner ring frame 60 has on its surface facing the outer ring frame 10 the same polarity as the polarity of the magnet 100 that is positioned on the inner circumference of the outer ring frame 10. In contrast, the permanent magnet 200 has on its surface facing the inner ring frame 60 the same polarity as the polarity of the magnet 100 that is positioned on the outer circumference of the inner ring frame 60. That is, as shown in FIG. 7, if the magnet 100 positioned on the inner circumference of the outer ring frame 10 has the polarity of the S pole, the permanent magnet 200 of the weight body 20 is oriented such that the same S pole is located on the surface facing the outer ring frame 10. In contrast, the permanent magnet 200 has on its surface facing the inner ring frame 60 the same polarity as the polarity of the magnet 100 positioned on the outer circumference of the inner ring frame 60, that is, the N pole. Thus, the weight body 20 positioned between the outer ring frame 10 and the inner ring frame 60 can utilize a repelling force caused by the same polarity.

Further, the inner ring frame 60 may comprise a pair of inner ring frames 60 that are provided on left and right sides with respect to the trajectory along which the connection shaft 210 connected to the weight body 20 moves, in such a way so as to be spaced apart from each other by a predetermined interval. This is because it is not possible to install other components in the trajectory along which the connection shaft 210 rotates, if the inner ring frame 60 exists, due to the configuration of connecting the weight body 20 with the rotation shaft 220 via the connection shaft 210. Thus, in order to secure the rotating trajectory of the connection shaft 210 and efficiently locate the inner ring frame 60, the configuration having the pair of inner ring frames 60 is applied as shown in FIG. 6.

On one hand, if all the magnets 100 of the outer ring frame 10 and the inner ring frame 60 are permanent magnets, the permanent magnets of the outer ring frame 10 and the permanent magnets of the inner ring frame 60 are arranged, respectively, in the circumferential direction in such a way that the permanent magnets are spaced apart from each other at regular intervals, as shown in FIG. 7. To be more specific, the permanent magnets of the outer ring frame 10 and the permanent magnets of the inner ring frame 60 are offset from each other such that permanent magnets of the outer ring frame 10 do not face the permanent magnets of the inner ring frame 60. That is, the permanent magnets of the outer ring frame 10 and the permanent magnets of the inner ring frame 60 are not arranged at the same angular positions from the rotation shaft 220. The permanent magnets of the outer ring frame 10 and the inner ring frame 60 are arranged so that they do not overlap each other but are alternated. Such an arrangement can minimize the required amount of the permanent magnets while maintaining a predetermined level of repelling force caused by the magnetic properties of the weight body 20 that is rotatably positioned between the outer ring frame 10 and the inner ring frame 60.

Figure 8:
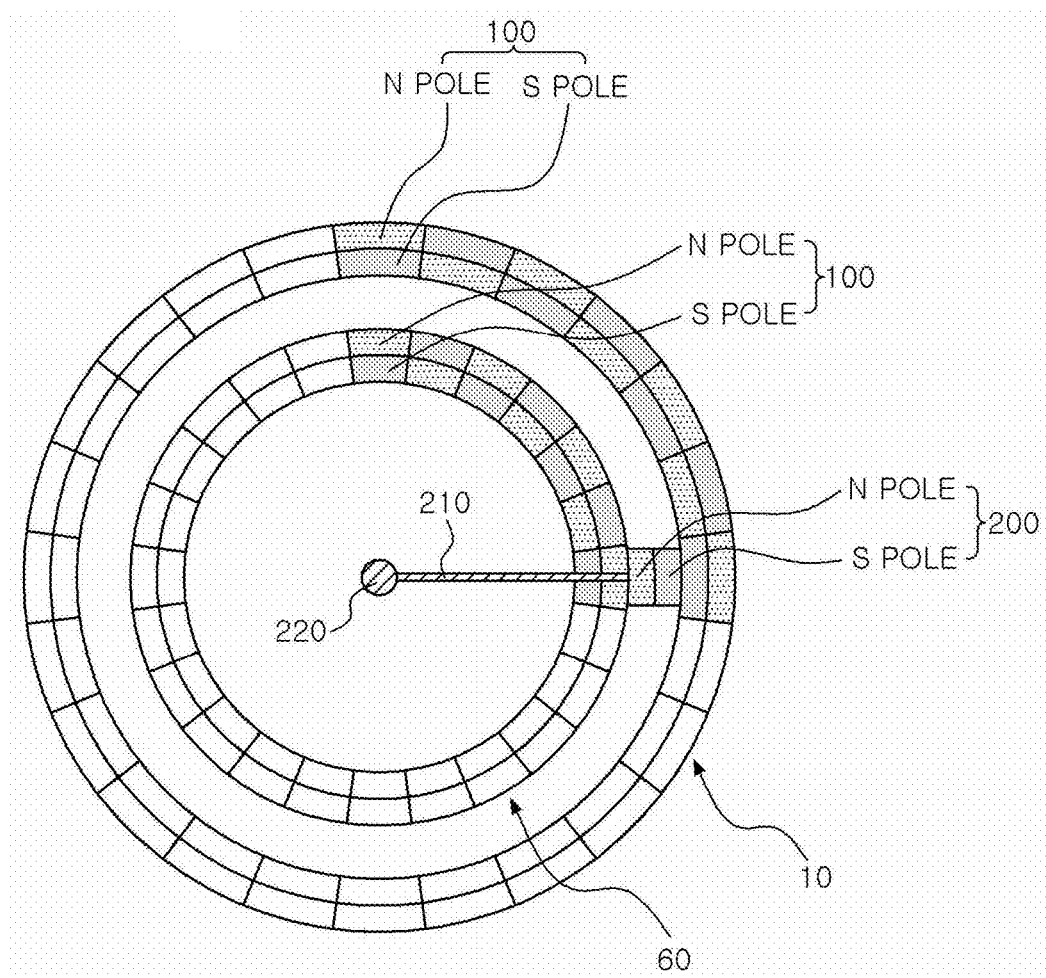
FIG. 8 is a sectional view showing a multipurpose rotation structure according to yet another embodiment of the present invention.

Referring to FIGS. 8 and 9, in a multipurpose rotation structure according to a further embodiment of the present invention, magnets 100 arranged on the outer ring frame 10 and the inner ring frame 60, respectively, comprise electromagnets that may be changed in polarity depending on the flow of current. Each of the electromagnets arranged on the outer ring frame 10 and the inner ring frame 60, respectively, is changed to have a polarity opposite to that of the permanent magnet 200 of the weight body 20 that is to face the electromagnets when the weight body 20 rotates and approaches, and is changed to have the same polarity as that of the permanent magnet 200 of the weight body 20 facing the electromagnets when the weight body 20 further rotates and passes (after the weight body 20 passes). This can increase the rotating speed of the weight body 20 by the magnetic force.

Figure 9A:
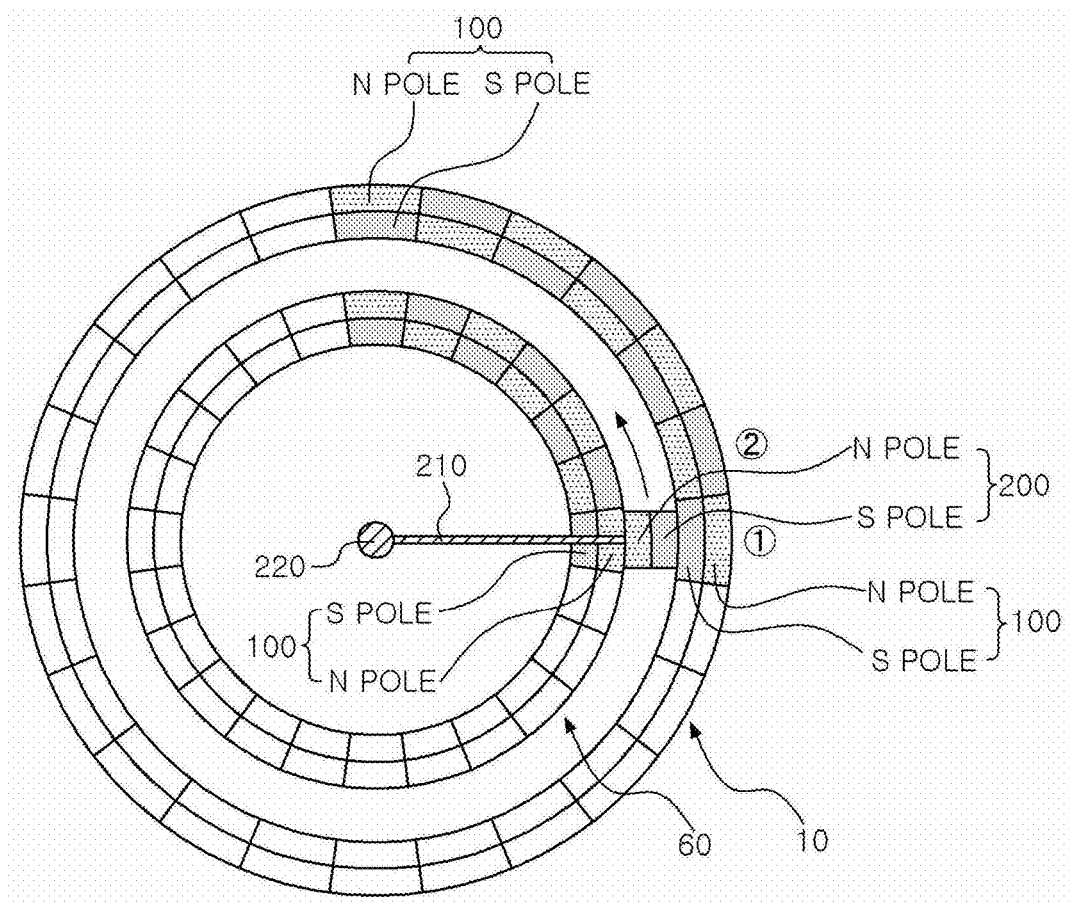
FIGS. 9A and 9B are views illustrating a process of sequentially changing the polarity of electromagnets of an outer ring frame and an inner ring frame of FIG. 8.
Figure 9B:
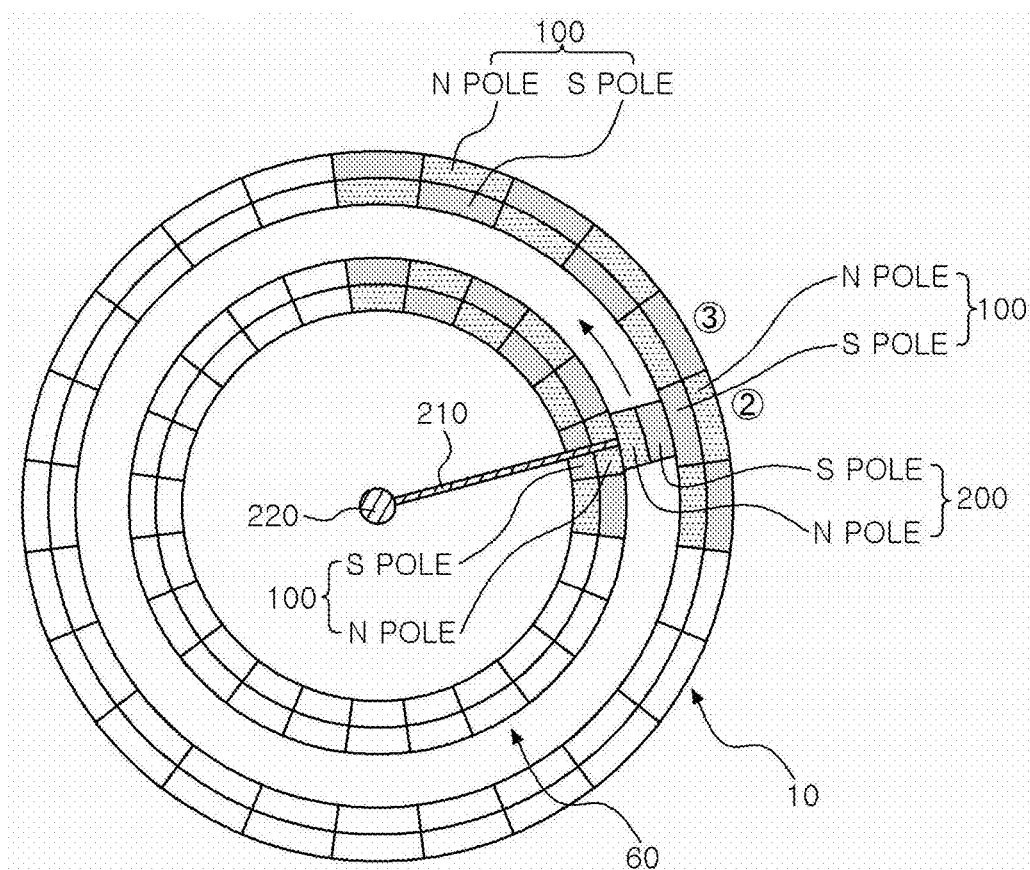

That is, if the magnets 100 disposed in the outer ring frame 10 and the inner ring frame 60, respectively, are electromagnets, it is possible to change the polarity of each electromagnet, depending on the circumstances, by controlling the direction of current that flows in the electromagnet. This will be described in detail with reference to FIGS. 9A and 9B. First, as shown in FIG. 9A, the polarity of the permanent magnet 200 of the weight body 20 is set, by way of example, such that a surface of the weight body 20 facing the outer ring frame 10 has the S pole, and a surface of the weight body 20 facing the inner ring frame 60 has the N pole. In this case, at a point (point ①) where the weight body 20 is being located, the polarity of the electromagnet of the outer ring frame 10 is changed to the S pole that is the same as the S pole of the facing weight body 20. Further, at the point (point ①) where the weight body 20 is being located, the polarity of the electromagnet of the inner ring frame 60 is changed to the N pole that is the same as the N pole of the facing weight body 20. Meanwhile, at a point (point ②) directly before the weight body 20, i.e., at a point that the rotating weight body 20 will approach soon, the polarity of the electromagnet of the outer ring frame 10 is changed to the N pole that is opposite to the polarity of the weight body 20 which will face the outer ring frame 10, namely, the S pole. Further, at the point (point ②) directly before the weight body 20, i.e., at the point that the rotating weight body 20 will approach soon, the polarity of the electromagnet of the inner ring frame 60 is changed to the S pole that is opposite to the polarity of the weight body 20 which will face the inner ring frame 60, namely, the N pole. In such a case, at the point (point ①) where the weight body 20 is being located at present, the weight body 20 is subjected to a repulsive force (repelling force) because the polarity of the weight body 20 is equal to the polarity of each of the electromagnets of the outer ring frame 10 and the inner ring frame 60 that face the weight body 20. Simultaneously, at the point (point ②) directly before the point ② in the rotating direction of the weight body 20, the weight body 20 is subjected to an attractive force (pulling force) because the polarity of the weight body 20 is opposite to the polarity of each of the electromagnets of the outer ring frame 10 and the inner ring frame 60 that will face the weight body 20. Such an action of the force allows the weight body 20 to rotate relatively more rapidly. Subsequently, as shown in FIG. 9B, if the weight body further rotates and then reaches point ②, the polarity of each of the electromagnets of the outer ring frame 10 and the inner ring frame 60 is changed to the same polarity as the weight body 20 that face the outer ring frame 10 and the inner ring frame 60 again at point ②. Further, at a point (point ③) where the weight body 20 further rotates from point ② and will approach soon, the polarity of each of the electromagnets of the outer ring frame 10 and the inner ring frame 60 is changed to be opposite to the polarity of the weight body 20 that will face the outer ring frame 10 and the inner ring frame 60. Therefore, as described above, the magnetic force, the repulsive force and the attractive force enable the weight body 20 to relatively more rapidly rotate. The above-mentioned change in polarity of the electromagnets of the outer ring frame 10 and the inner ring frame 60 is repeated.

On one hand, the electromagnets disposed in the outer ring frame 10 and the inner ring frame 60, respectively, can save required energy by cutting off current in a region where the weight body 20 does a free fall and rotates upward by inertia. That is, as shown in FIGS. 9A and 9B, each of the electromagnets disposed in the outer ring frame 10 and the inner ring frame 60 periodically changes the polarity depending on the change in flow of the current in a region from an approximately 3 o'clock position to a 12 o'clock position (region from approximately 270° to 360° (or) 0°). In contrast, in the remaining region, the weight body 20 can normally perform the free fall and the upward rotation by the inertia, so that the current is cut off in such a region and thereby the required energy can be reduced.

Figure 11:
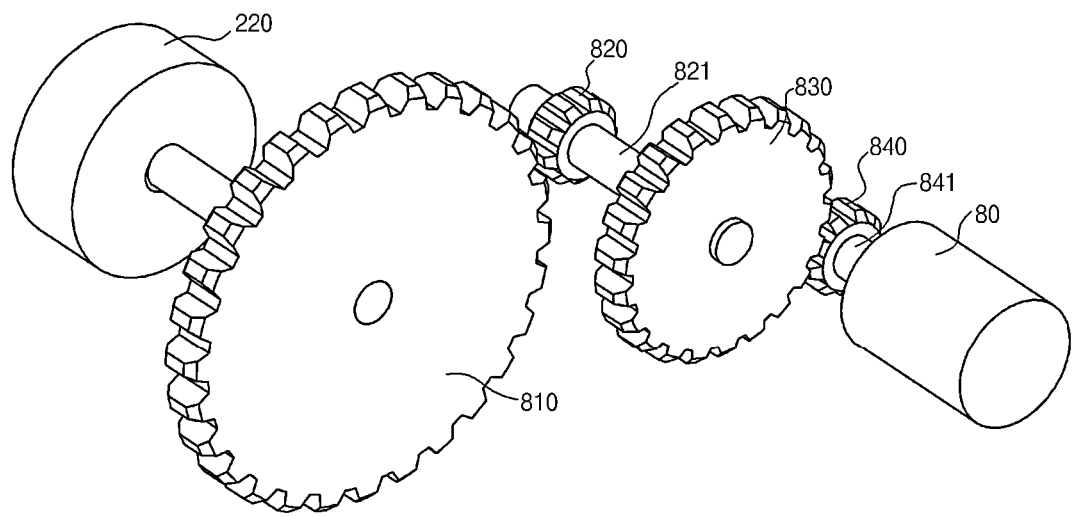
FIG. 11 is a perspective view showing the configuration of a generator in FIG. 10.

Referring to FIGS. 10 and 11, a multipurpose rotation structure according to another embodiment of the present invention further includes a generator 80 that generates power using kinetic energy of the rotation shaft 220 that rotates in conjunction with a rotation of the weight body 20. Here, an amount of energy generated by the generator 80 is separately displayed on the display unit 90, so that the multipurpose rotation structure can be utilized as a teaching tool for experiencing power generation using the kinetic energy.

The generator 80 is configured to generate power using the rotating force of the rotation shaft 220. The generator 80 is positioned in such a way so as to be connected to an extension of the rotation shaft 220 as shown in FIG. 10. In order to enhance the power generation of the generator 80, as shown in FIG. 11, the generator 80 includes a driving gear 810 that is rotated by the rotating force of the rotation shaft 220, a first driven gear 820 that is rotated in conjunction with the driving gear 810 and has a smaller radius than that of the driving gear 810, a second driven gear 830 that is coupled to a rotation shaft 821 of the first driven gear 820 to rotate in the same manner as the first driven gear 820 and has a larger radius than that of the first driven gear 820, and a third driven gear 840 that is rotated in conjunction with the second driven gear 830 and has a smaller radius than that of the second driven gear 830. The generator 80 may be coupled to a rotation shaft 841 of the third driven gear 840 to generate power using the rotation of the rotation shaft 841 of the third driven gear 840.

The driving gear 810 is configured to be rotated by the rotating force of the rotation shaft 220. To be more specific, the driving gear 810 is coupled to the rotation shaft 220 to be rotated in conjunction with the rotation of the rotation shaft 220.

The first driven gear 820 is rotated in conjunction with the driving gear 810 and has a smaller radius than that of the driving gear 810. The first driven gear 820 engages with the driving gear 810 to rotate in a direction opposite to the rotating direction of the driving gear 810. Here, since the first driven gear 820 is smaller in radius than the driving gear 810, the first driven gear 820 can be rotated more rapidly than the driving gear 810. In other words, for example, assuming that the radius of the first driven gear 820 is a half of the radius of the driving gear 810, when the driving gear 810 rotates once, the first driven gear 820 engaging therewith rotates twice, so that the first driven gear 820 can rotate twice as rapidly as the driving gear 810.

The second driven gear 830 is coupled to the rotation shaft 821 of the first driven gear 820 in such a way so as to rotate in the same manner as the first driven gear 820, and is larger in radius than the first driven gear 820. The second driven gear 830 shares the rotation shaft 821 with the first driven gear 820. Thus, assuming that the radius of the second driven gear 830 is twice as large as the radius of the first driven gear 820, the circumferential length of the second driven gear 830 is twice as long as that of the first driven gear 820, but the second driven gear 830 rotates in the same manner as the first driven gear 820 (i.e., while the first driven gear 820 rotates once, the second driven gear 830 also rotates once).

The third driven gear 840 rotates in conjunction with the second driven gear 830 and is smaller in radius than the second driven gear 830. The third driven gear 840 engages with the second driven gear 830 in such a way so as to rotate in a direction opposite to the rotating direction of the second driven gear 830. Here, since the third driven gear 840 is smaller in radius than the second driven gear 830, the third driven gear 840 can be rotated more rapidly than the second driven gear 830. That is, for example, assuming that the radius of the third driven gear 840 is a half of the radius of the second driven gear 830, when the second driven gear 830 rotates once, the third driven gear 840 engaging therewith rotates twice, so that the third driven gear 840 can rotate twice as rapidly as the second driven gear 830. In summary, even if the third driven gear 840 is equal in radius to the first driven gear 820, the third driven gear 840 is not rotated directly in conjunction with the first driven gear 820 but is rotated in conjunction with the second driven gear 830 that is larger in radius than the first driven gear 820, so that the third driven gear 840 can rotate twice as rapidly as the first driven gear 820. Consequently, the third driven gear 840 can rotate four times as rapidly as the driving gear 810. Thus, the larger the differences in radius between the driving gear 810 and the first driven gear 820, between the first driven gear 820 and the second driven gear 830, and between the second driven gear 830 and the third driven gear 840 are, the more rapidly the rotating speed of the third driven gear 840 as compared to the driving gear 810 is.

In this case, the generator 80 is coupled to the rotation shaft 841 of the third driven gear 840 and generates electricity using the rotation of the rotation shaft 841 of the third driven gear 840. As described above, since the rotating speed of the third driven gear 840 is higher than that of the driving gear 810 or the first driven gear 820, the generator 80 using the rotation of the third driven gear 840 rather than the rotation of the driving gear 810 or the first driven gear 820 can produce a larger amount of electricity. Since the principle wherein the generator 80 generates power using the rotation of the rotation shaft 841 of the third driven gear 840 complies with a power generating principle using a coil and a permanent magnet, which is generally widely used, the detailed description thereof will be omitted.

The display unit 90 displays the amount of energy generated by the generator 80 to allow a user to visually perceive the amount. Through the display unit 90, a user can experience power generation using kinetic energy. The display unit 90 is installed around the rotation structure according to the present invention to allow a user to observe it. Thus, a user can perceive the amount of green energy generated using the kinetic energy of the weight body 20 that continuously repeats rotating motions and of the rotation shaft 220 that is rotated in conjunction with the weight body 20, and the magnitude of power generated therefrom. Therefore, he or she can learn the utility and importance of the green energy more vividly while finding enjoyment and interest as compared to teaching via writing or speaking, thus heightening a learning effect.

Figure 12:
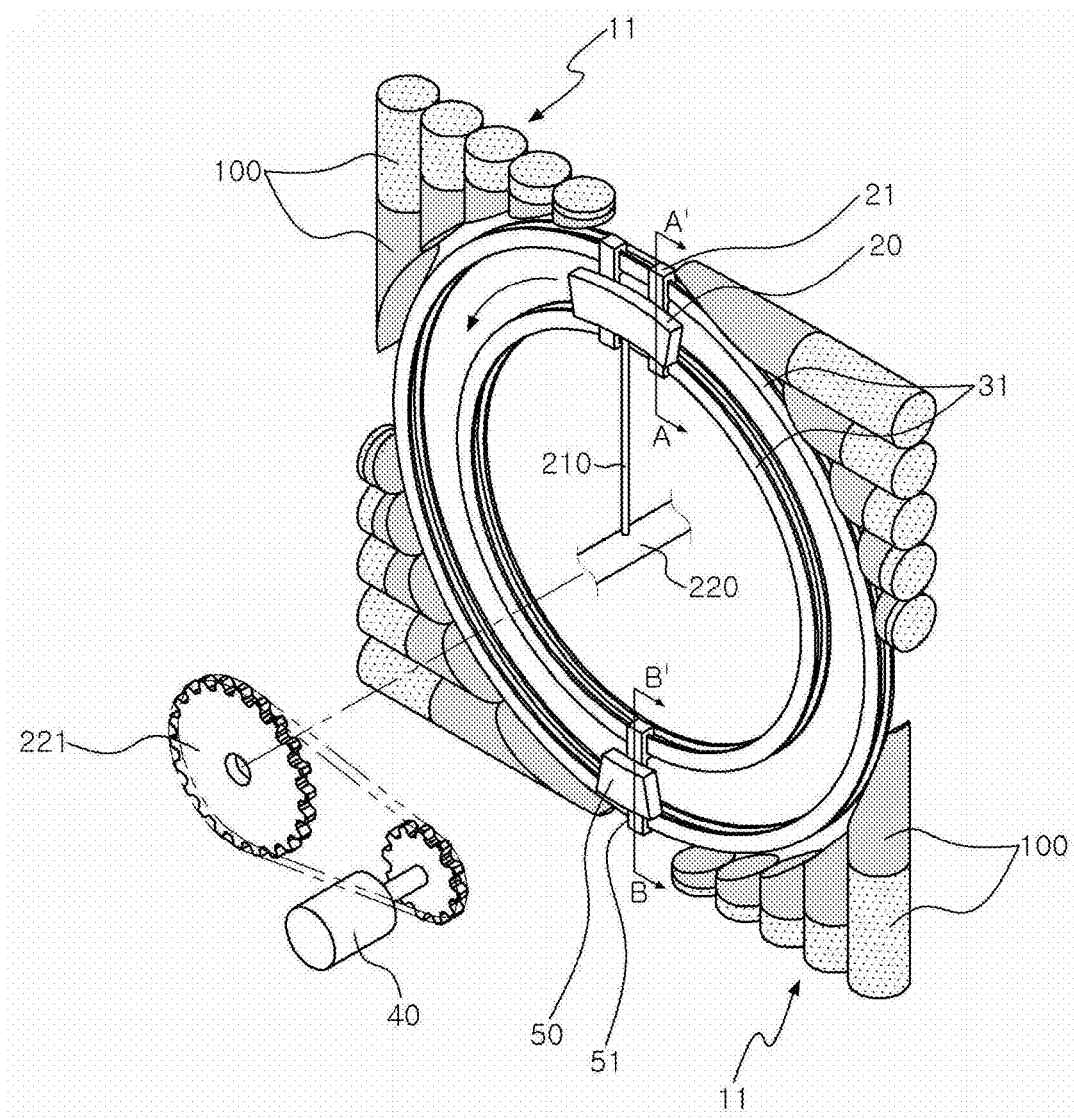
FIG. 12 is an exploded perspective view showing a multipurpose rotation structure according to another embodiment of the present invention.
Figure 13:
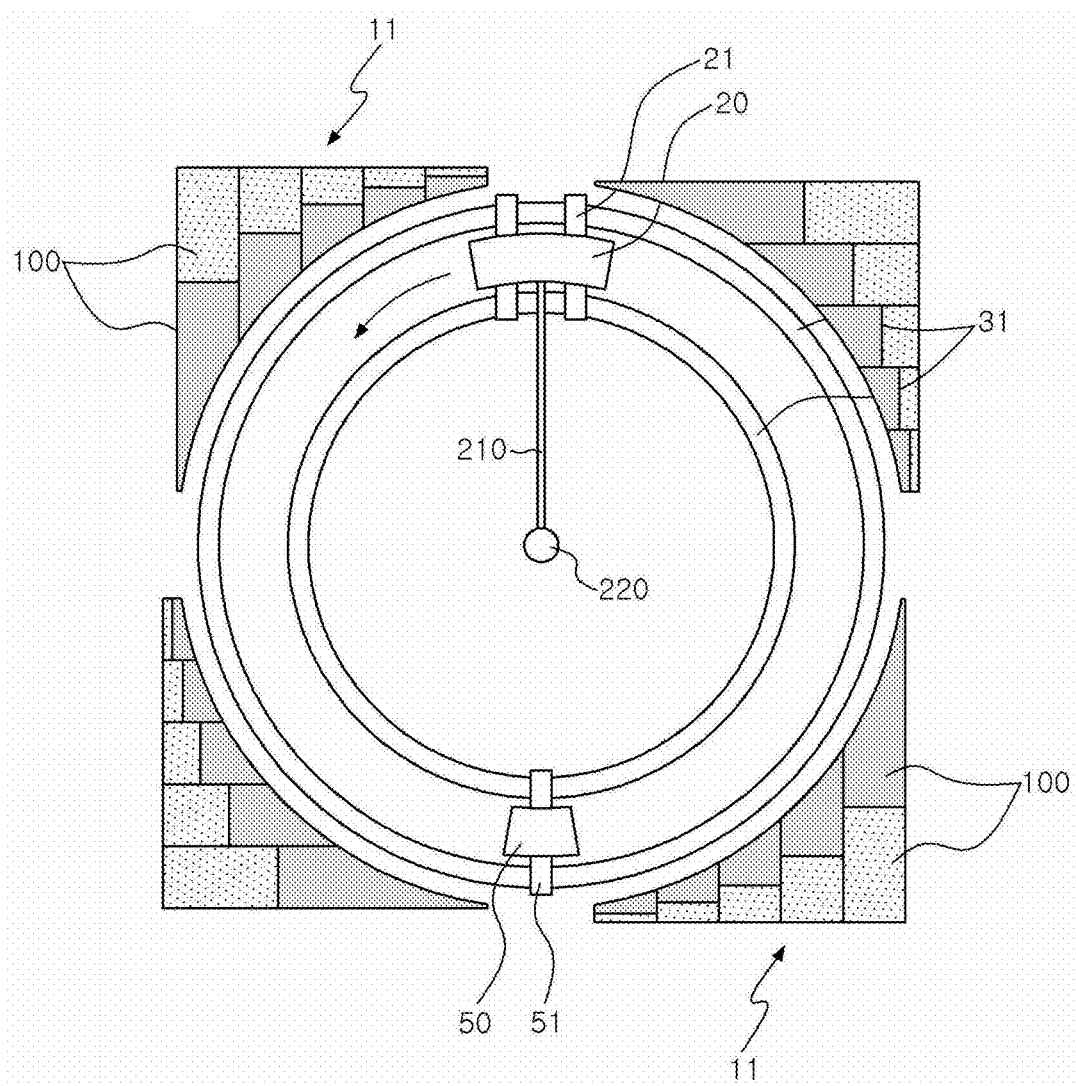
FIG. 13 is a front view of FIG. 12.

Further, referring to FIGS. 12 to 14, a multipurpose rotation structure according to a further embodiment of the present invention includes a rod frame 11 formed by arranging cylindrical rods, instead of the outer ring frame 10, and a guide rail 31 to guide a trajectory on which the weight body 20 and the second weight body 50 travel, instead of the guide ring 30.

Figure 14A:
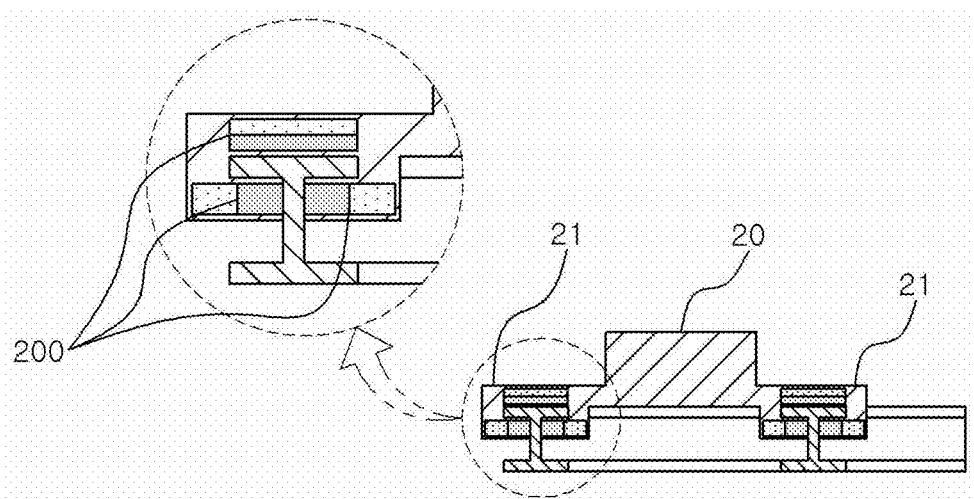
FIGS. 14A and 14B are sectional views showing a weight body and a second weight body, taken along line A-A' and line B-B' of FIG. 12, respectively.
Figure 14B:
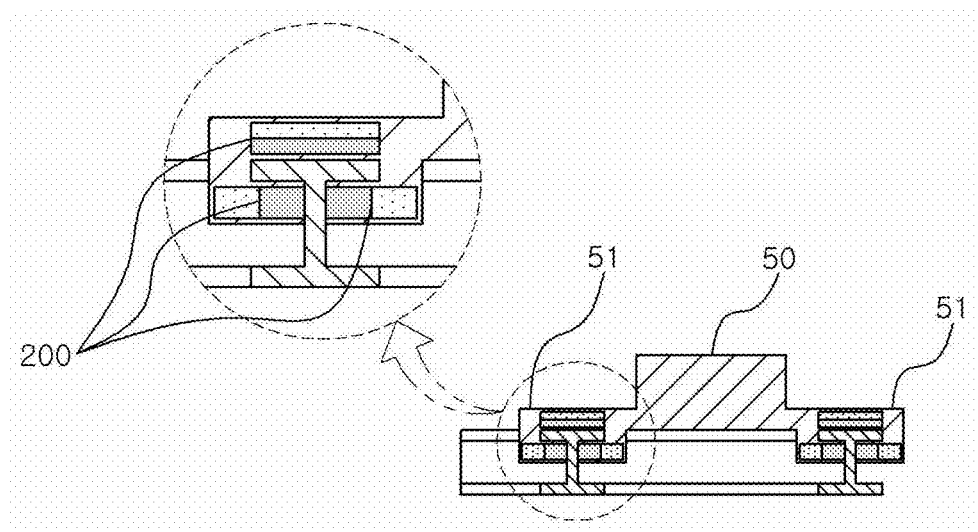

As shown in FIGS. 12 and 13, the rod frame 11 is disposed outside the weight body 20 and the second weight body 50 instead of the outer ring frame 10, and includes magnets 100 therein so that a magnetic force, namely, a repelling force, affects the rotation of the weight body 20 and the second weight body 50. As shown in FIGS. 12 and 13, the rod frame 11 may be disposed throughout 360 degrees along an outer circumference of the guide rail 31. If necessary, when viewed with reference to FIG. 13, the rod frame may comprise a pair of frames that are located in a section from 9 o'clock to 12 o'clock and a section from 3 o'clock to 6 o'clock, or a pair of frames that are located in a section from 12 o'clock to 3 o'clock and a section from 6 o'clock to 9 o'clock. As such, various configurations can increase repelling force between the magnets. Further, as shown in FIGS. 12 and 13, the guide rail 31 serves to guide the trajectory on which the weight body 20 and the second weight body 50 travel, instead of the guide ring 30. Here, the weight body 20 and the second weight body 50 moving along the guide rail 31 include, respectively, supports 21 and 51 that are coupled to the guide rail 31. In this case, the above-mentioned permanent magnet 200 included in each of the weight body 20 and the second weight body 50 has a 'U' shape as shown in FIGS. 14A and 14B, and is placed on the support 21, 51 surrounding the guide rail 31 to interact with the magnets 100 included in the rod frame 11. Since the movement of the weight body 20 and the second weight body 50 and the interaction between the magnets 100 and the permanent magnet 200 during the movement remain the same as the above embodiments, a duplicated description thereof will be omitted herein.

As described above, the present invention provides a multipurpose rotation structure which is installed indoors or outdoors to be utilized for multiple purposes such as experience teaching tools by using repelling force between magnets disposed in an outer ring frame having the shape of a ring and in a weight body rotating in an inner space of the outer ring frame The present invention provides a multipurpose rotation structure which can be utilized for multiple purposes such as experience teaching tools by using repelling force between magnets disposed in a weight body and a second weight body placed on the same guide ring.

The present invention provides a multipurpose rotation structure which can be utilized for multiple purposes such as experience teaching tools by using repelling force between magnets disposed in an outer ring frame and an inner ring frame that are opposite to each other with respect to a weight body.

The present invention provides a multipurpose rotation structure, in which each of electromagnets arranged on an outer ring frame and an inner ring frame, respectively, is changed to have a polarity opposite to that of a permanent magnet of a weight body that is to face the electromagnets when the weight body rotates and approaches, and is changed to have the same polarity as that of the permanent magnet of the weight body facing the electromagnets when the weight body further rotates and passes, so that the multipurpose rotation structure is utilized for multiple purposes such as experience teaching tools using the attractive force and repulsive force between magnets.

The present invention provides a multipurpose rotation structure which includes a motor operated via green energy produced from a solar photovoltaic power generator, and a display unit displaying an amount of the inputted green energy and a magnitude of power of the motor obtainable from the inputted green energy, thus enabling a user to directly perceive the amount of the green energy and the magnitude of the power obtainable therefrom, and thereby being utilized as a teaching tool for experiencing green energy.

The present invention provides a multipurpose rotation structure which further includes a generator generating power using kinetic energy of a rotation shaft that rotates in conjunction with rotation of a weight body, and in which an amount of energy generated by the generator is separately displayed on the display unit, so that the multipurpose rotation structure is utilized as a teaching tool for experiencing power generation using the kinetic energy.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A multipurpose rotation structure, comprising:
   an outer ring frame formed in a ring shape having a predetermined thickness, with magnets being sequentially provided in the outer ring frame in a circumferential direction thereof;
   a weight body provided on a first end of a connection shaft, rotating around a rotation shaft to which a second end of the connection shaft is secured, and including a permanent magnet, the permanent magnet having, on a surface of the weight body that faces the outer ring frame, polarity that is the same as that of the magnets sequentially arranged in the circumferential direction of the outer ring frame;
   a guide ring connected to a central portion of the weight body, and guiding the weight body that is rotatably formed along a trajectory on which the weight body rotates; and
   a motor connected to the rotation shaft, and giving power when the weight body rotates upwards from a lower position to an upper position.

2. The multipurpose rotation structure as set forth in claim 1, wherein each of the magnets arranged in the circumferential direction of the outer ring frame has a shape of an isosceles triangle so that both sides thereof with respect to a perpendicular line of a vertex thereof have opposite polarities, and
   the magnets arranged successively in the circumferential direction of the outer ring frame are overlappingly disposed in such a way that a side of a magnet is laid over a side of an adjacent magnet, whereby the same polarity is always placed on an inner circumference of the outer ring frame.

3. The multipurpose rotation structure as set forth in claim 1, further comprising:
   a second weight body provided on the guide ring that is formed along the trajectory on which the weight body rotates, the second weight body being smaller in weight than the weight body and including a permanent magnet,
   wherein magnets having the same polarity are disposed, respectively, on surfaces of the weight body and the second weight body making contact with each other while they are rotating, thus maximizing a repelling force caused by an impact between the weight body and the second weight body.

4. The multipurpose rotation structure as set forth in claim 3, wherein each of the weight body and the second weight body includes bar-shaped permanent magnets on both ends thereof, each of the permanent magnets having different polarities on left and right sides thereof, and
   the bar-shaped permanent magnets are arranged in such a way that the same polarity is placed on both the ends of the weight body and the second weight body.

5. The multipurpose rotation structure as set forth in claim 1, further comprising:
   an inner ring frame formed in a ring shape having a predetermined thickness, and positioned in an inner space of the outer ring frame in such a way so as to be opposite to the outer ring frame with respect to the guide ring, with magnets being provided in the inner ring frame in such a way so as to be sequentially arranged in a circumferential direction thereof,
   wherein the weight body includes, on a surface thereof facing the inner ring frame, a permanent magnet that has the same polarity as the magnets that are sequentially arranged in the circumferential direction of the inner ring frame.

6. The multipurpose rotation structure as set forth in claim 5, wherein the inner ring frame comprises a pair of inner ring frames that are provided, respectively, on left and right sides of a trajectory along which the connection shaft connected to the weight body passes, in such a way so as to be spaced apart from each other by a predetermined interval.

7. The multipurpose rotation structure as set forth in claim 6, wherein permanent magnets arranged on the outer ring frame and permanent magnets arranged on the inner ring frame are spaced, respectively, apart from each other by predetermined intervals in circumferential directions thereof, and portions of the outer ring frame on which the permanent magnets are disposed correspond to portions of the inner ring frame on which the permanent magnets are not disposed, the outer and inner ring frames being disposed such that the permanent magnets of the outer ring frame do not directly face the permanent magnets of the inner ring frame.

8. The multipurpose rotation structure as set forth in claim 5, wherein the magnets arranged on the outer ring frame and the inner ring frame, respectively, comprise electromagnets, and each of the electromagnets arranged on the outer ring frame and the inner ring frame, respectively, is changed in polarity such that it has a polarity opposite to a polarity of the permanent magnet of the weight body that is to face the electromagnets when the weight body rotates and approaches, but has the same polarity as a polarity of the permanent magnet of the weight body facing the electromagnets when the weight body further rotates and passes.

9. The multipurpose rotation structure as set forth in claim 8, wherein, in a region where the weight body does a free fall and rotates upwards by inertia, current supplied to each of the electromagnets arranged on the outer ring frame and the inner ring frame, respectively, is cut off, thus reducing required energy.

10. The multipurpose rotation structure as set forth in 9, wherein the motor is operated by inputting green energy produced from a solar-light power generation facility, and a display unit is further included to display an amount of the inputted green energy and a magnitude of power of the motor obtainable from the inputted green energy, whereby the multipurpose rotation structure enables a user to directly perceive the amount of the green energy and the magnitude of the power obtainable therefrom, thus being utilized as a teaching tool for experiencing green energy.

11. The multipurpose rotation structure as set forth in claim 10, further comprising:

a generator generating power using kinetic energy of the rotation shaft that rotates in conjunction with rotation of the weight body, wherein an amount of energy generated by the generator is separately displayed on the display unit, so that the multipurpose rotation structure is utilized as a teaching tool for experiencing power generation using the kinetic energy.

* * * * *